(12) United States Patent
Lee

(10) Patent No.: US 7,867,347 B2
(45) Date of Patent: Jan. 11, 2011

(54) METHOD FOR CONTROLLING HEATING ROLLERS AND LAMINATOR USING SUCH METHOD

(75) Inventor: Yen-Te Lee, Taipei (TW)

(73) Assignee: Primax Electronics Ltd., Taipei (TW)

( * ) Notice: Subject to any disclaimer, the term of this patent is extended or adjusted under 35 U.S.C. 154(b) by 330 days.

(21) Appl. No.: 12/128,236

(22) Filed: May 28, 2008

(65) Prior Publication Data

US 2009/0173427 A1    Jul. 9, 2009

(30) Foreign Application Priority Data

Jan. 4, 2008    (CN) .................... 2008 1 0001969

(51) Int. Cl.
*B32B 37/00*    (2006.01)
(52) U.S. Cl. ..................... 156/64; 156/359; 156/555
(58) Field of Classification Search ................... 156/64, 156/228, 359, 555, 580, 582, 583.1
See application file for complete search history.

(56) References Cited

U.S. PATENT DOCUMENTS

| 5,133,828 | A | * | 7/1992 | Jacques | ....................... 156/555 |
| 5,232,538 | A | * | 8/1993 | Liu | ............................. 156/359 |

* cited by examiner

*Primary Examiner*—James Sells
(74) *Attorney, Agent, or Firm*—Kirton & McConkie; Evan R. Witt

(57) ABSTRACT

The present invention relates to a laminator and a method for controlling the heating rollers of the laminator. In the preheating stage, the rotational directions of the heating rollers are reverse to those during the heating and pressing operation. As a consequence, the article fails to be transported across the region between the heating rollers before the heating and pressing operation is performed.

1 Claim, 2 Drawing Sheets

METHOD FOR CONTROLLING HEATING ROLLERS AND LAMINATOR USING SUCH METHOD

FIELD OF THE INVENTION

The present invention relates to a laminator, and more particularly to a laminator having a mechanism of preventing the laminated object from being transported across the region between the heating rollers in the preheating stage. The present invention also relates to a method for controlling the heating rollers of the laminator.

BACKGROUND OF THE INVENTION

Conventionally, a valuable sheet article such as a paper sheet or a photograph is usually covered with a protective film for protection because such an article is readily suffered from damage. Typically, a laminator is used for laminating a sheet article between two pieces of plastic films.

FIG. 1A and FIG. 1B are schematic cross-sectional views of a conventional laminator. Hereinafter, operations of the conventional laminator will be illustrated in more details with reference to FIG. 1A and FIG. 1B. The laminator 1 principally comprises an entrance channel 10, a first heating roller 11, a second heating roller 12, a heating unit 13 and an exit channel 14. After the laminator 1 is powered on, the heat offered by the heating unit 13 is transferred to the first heating roller 11 and the second heating roller 12 in order to perform a preheating operation. In the preheating stage, the first heating roller 11 is rotated in a second direction R2 and the second heating roller 12 is rotated in a first direction R1, wherein the first direction R1 is opposed to the second direction R2. Upon rotation of the first heating roller 11 and the second heating roller 12, the heat offered by the heating unit 13 may be more uniformly transferred to the first heating roller 11 and the second heating roller 12. After the preheating operation is completed, a laminated object 15 of a sheet article 15C intervening between a first plastic film 15A and a second plastic film 15B is fed into the laminator 1 through the entrance channel 10. Next, the laminated object 15 is transported by the first heating roller 11 and the second heating roller 12 while both sides of the laminated object 15 are heated and pressed by the first heating roller 11 and the second heating roller 12. During the laminated object 15 is heated and pressed by the first heating roller 11 and the second heating roller 12, the first plastic film 15A and the second plastic film 15B are thermally softened and thus the sheet article 15C is laminated between the first plastic film 15A and the second plastic film 15B. After the laminated object 15 is ejected from the exit channel 14, the laminating operation is completed.

The laminator 1, however, still has some drawbacks. For example, if the laminated object 15 of the sheet article 15C intervening between the first plastic film 15A and the second plastic film 15B is fed into the laminator 1 in the preheating stage, the laminated object 15 will be transported by the first heating roller 11 and the second heating roller 12 because the first heating roller 11 is rotated in the second direction R2 and the second heating roller 12 is rotated in the first direction R1. Since the temperature of the heating roller 11 or 12 is not enough to perform the heating and pressing operation, the first plastic film 15A and the second plastic film 15B transported across the heating rollers 11 and 12 are not sufficiently softened. Under this circumstance, the sheet article 15C fails to be successfully laminated between the first plastic film 15A and the second plastic film 15B or some hazy bubbles are readily formed in the resulting structure to blur the sheet article 15C.

For enhancing the performance of the laminator, there is a need of providing a proper protecting mechanism to prevent from feeding the laminated object into the laminator before the heating rollers reach the working temperature required for performing the heating and pressing operation.

SUMMARY OF THE INVENTION

It is an object of the present invention to provide a laminator having a mechanism of reversing rotating the heating rollers in the preheating stage, thereby preventing the laminated object from being transported across the region between the heating rollers. As a result, the problems of causing poor laminating effect or forming hazy bubbles can be overcome.

Another object of the present invention provides a method for controlling the heating rollers of the laminator.

In accordance with an aspect of the present invention, there is provided a laminator for heating and pressing a laminated object. The laminator includes a first heating roller and a second heating roller. The first heating roller is rotated in a first direction and the second heating roller is rotated in a second direction in a preheating stage of the laminator, wherein the first direction is opposed to the second direction. The first heating roller is rotated in the second direction and the second heating roller is rotated in the first direction during a heating and pressing operation of the laminator.

In an embodiment, the laminator is in the preheating stage if the temperature of the first heating roller is smaller than a working temperature.

In an embodiment, the laminator performs the heating and pressing operation if the temperature of the first heating roller is not smaller than a working temperature.

In an embodiment, the laminator further comprises a temperature sensor for detecting the temperature of the first heating roller.

In accordance with another aspect of the present invention, there is provided a method for controlling heating rollers of a laminator. The laminator includes a first heating roller and a second heating roller. The method includes steps of detecting the temperature of the first heating roller; driving the first heating roller to rotate in a first direction and driving the second heating roller to rotate in a second direction if the temperature of the first heating roller is smaller than a working temperature, wherein the first direction is opposed to the second direction; and driving the first heating roller to rotate in the second direction and driving the second heating roller to rotate in the first direction if the temperature of the first heating roller is not smaller than the working temperature.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks encountered from the prior art, the present invention provides a laminator and a method of controlling heating rollers of the laminator.

Figure 1A:
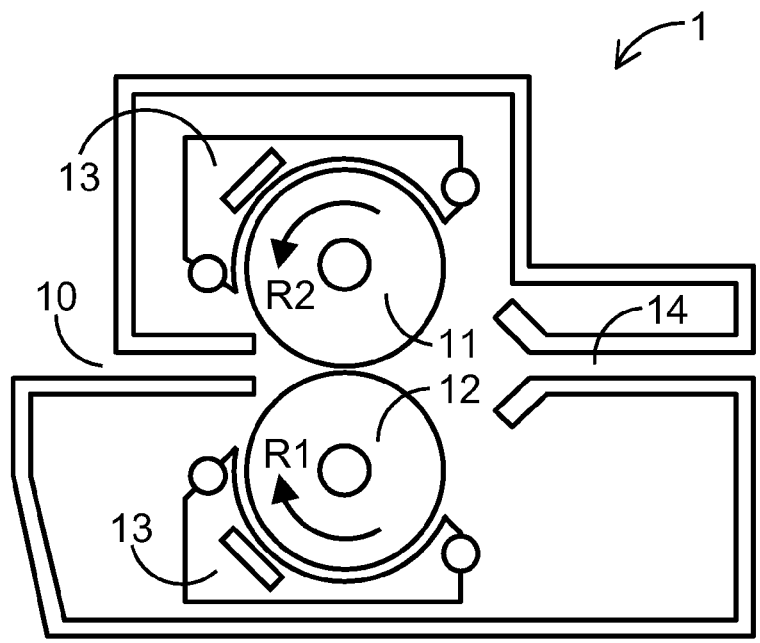
FIG. 1A is a schematic cross-sectional view illustrating a conventional laminator.
Figure 1B:
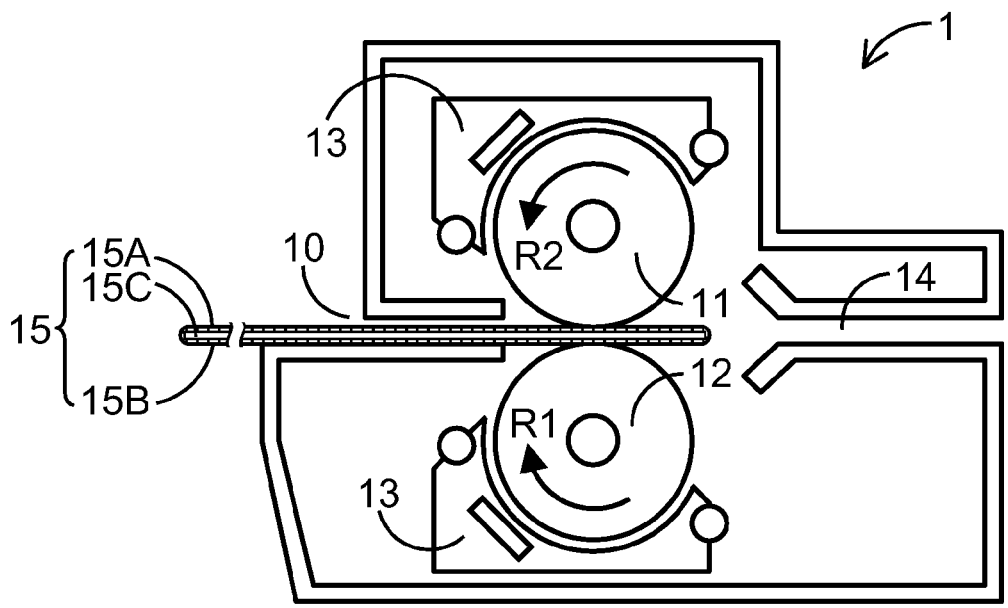
FIG. 1B is a schematic cross-sectional view illustrating a laminated object fed into the laminator of FIG. 1A in the preheating stage.
Figure 2A:
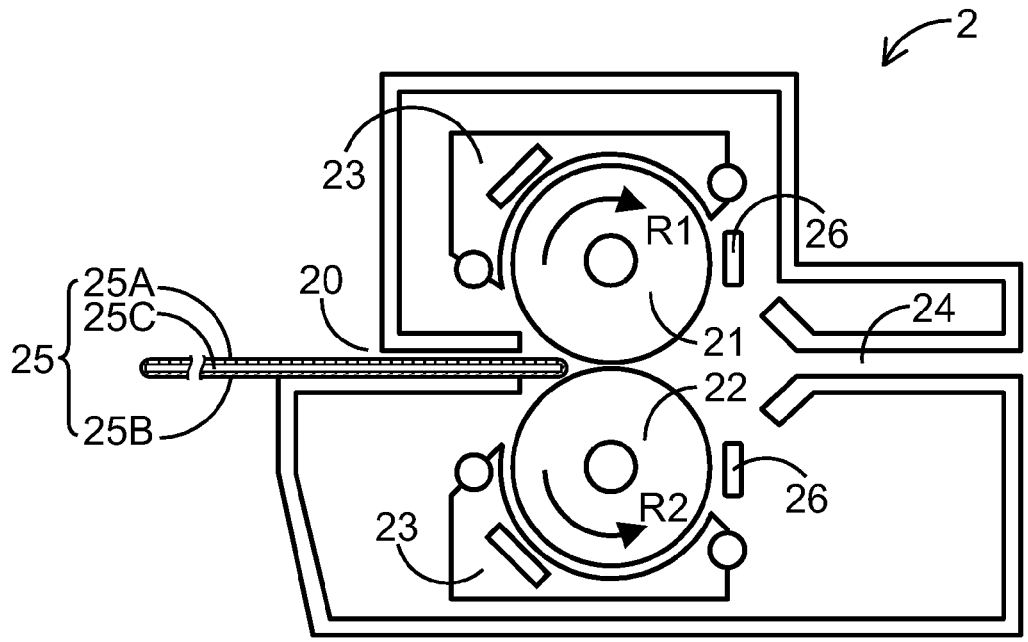
FIG. 2A is a schematic cross-sectional view illustrating a laminator according to a preferred embodiment of the present invention, in which the laminated object fails to be transported across the region between two heating rollers.
Figure 2B:
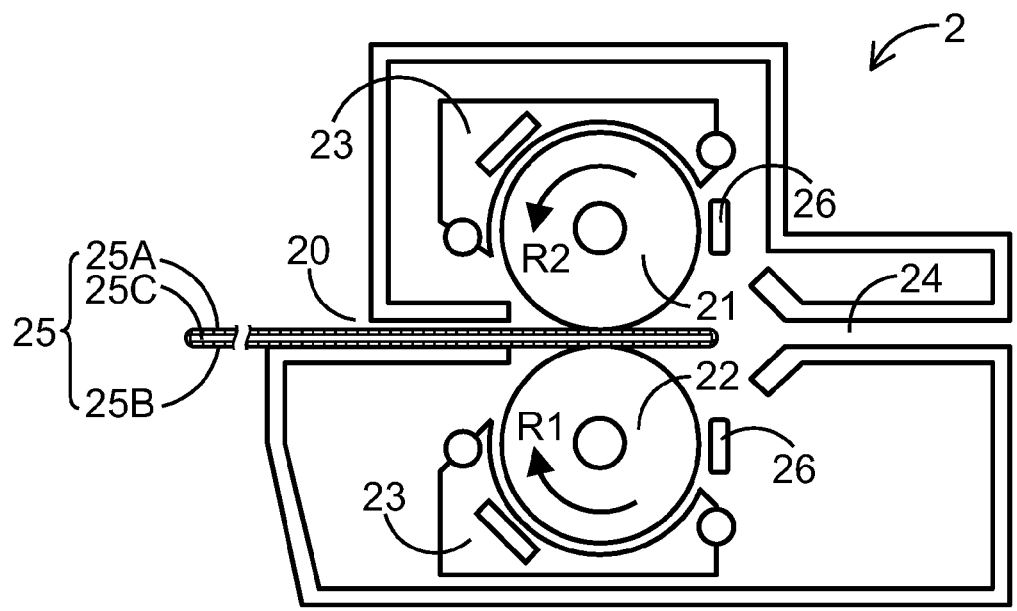
FIG. 2B is a schematic cross-sectional view illustrating a laminated object fed into the laminator of FIG. 2A during the heating and pressing operation.

FIG. 2A and FIG. 2B are schematic cross-sectional views illustrating a laminator according to a preferred embodiment of the present invention. Hereinafter, operations of the laminator will be illustrated in more details with reference to FIG. 2A and FIG. 2B.

The laminator 2 principally comprises an entrance channel 20, a first heating roller 21, a second heating roller 22, a heating unit 12, an exit channel 24 and a temperature sensor 26. After the laminator 2 is powered on, the heat offered by the heating unit 23 is transferred to the first heating roller 21 and the second heating roller 22 in order to perform a preheating operation. In the preheating stage as shown in FIG. 2A, the first heating roller 21 is rotated in a first direction R1 and the second heating roller 22 is rotated in a second direction R2, wherein the first direction R1 is opposed to the second direction R2. Upon rotation of the first heating roller 21 and the second heating roller 22, the heat offered by the heating unit 23 may be more uniformly transferred to the first heating roller 21 and the second heating roller 22. On the other hand, since the rotational directions of the first heating roller 21 and the second heating roller 22 in the preheating stage are reverse to those during the heating and pressing operation, any article fails to be transported across the region between the first heating roller 21 and the second heating roller 22. In other words, even if a laminated object 25 of a sheet article 25C intervening between a first plastic film 25A and a second plastic film 25B is inserted into the entrance channel 20 in the preheating stage, the laminated object 25 fails to be transported by the first heating roller 21 and the second heating roller 22 into the laminator 2 but ejects the laminated object 25 out of the entrance channel 20.

Until the first heating roller 21 or the second heating roller 22 of the laminator 2 reach the working temperature required for performing the heating and pressing operation, the first heating roller 21 and the second heating roller 22 are reversely rotated. As shown in FIG. 2B, the first heating roller 21 is rotated in the second direction R2 and the second heating roller 22 is rotated in the first direction R1. Next, a laminated object 25 of a sheet article 25C intervening between a first plastic film 25A and a second plastic film 25B is fed into the laminator 2 through the entrance channel 20. The laminated object 25 is transported by the first heating roller 21 and the second heating roller 22 while both sides of the laminated object 25 are heated and pressed by the first heating roller 21 and the second heating roller 22. During the laminated object 25 are heated and pressed by the first heating roller 21 and the second heating roller 22, the first plastic film 25A and the second plastic film 25B are thermally softened and thus the sheet article 25C is laminated between the first plastic film 25A and the second plastic film 25B. After the laminated object 25 is ejected to the exit channel 24, the laminating operation is completed.

Please refer to FIG. 2A and FIG. 2B again. The temperature sensor 26 of the laminator is used to discriminate whether the first heating roller 21 or the second heating roller 22 reaches its working temperature. The temperature sensor 26 is disposed beside the first heating roller 21 or the second heating roller 22 for detecting the temperature of the first heating roller 21 or the second heating roller 22. In a case that the temperature of the first heating roller 21 or the second heating roller 22 is smaller than a predetermined working temperature or a user-defined working temperature after the laminator 2 is powered on, it is meant that the laminator 2 is still in the preheating stage and thus no heating and pressing operation should be done. Meanwhile, as shown in FIG. 2A, the first heating roller 21 is rotated in a first direction R1 and the second heating roller 22 is rotated in a second direction R2 so as to prevent the laminated object 25 from being transported across the region between the first heating roller 21 and the second heating roller 22. Whereas, if the temperature of the first heating roller 21 or the second heating roller 22 is not smaller than (i.e. greater than or equal to) the predetermined working temperature or the user-defined working temperature, it is meant that the laminator 2 can perform the heating and pressing operation. Meanwhile, the first heating roller 21 and the second heating roller 22 are reversely rotated. As shown in FIG. 2B, the first heating roller 21 is rotated in the second direction R2 and the second heating roller 22 is rotated in the first direction R1 so as to feed the laminated object 25 into the laminator 2 and perform the heating and pressing operation.

Please refer to FIG. 2A and FIG. 2B again. The present invention also relates to a method of controlling the heating rollers of the laminators. The method comprises the following steps. First of all, the temperature of the first heating roller 21 or the second heating roller 22 is detected. If the temperature of the first heating roller 21 or the second heating roller 22 is smaller than a working temperature, the first heating roller 21 is rotated in a first direction R1 and the second heating roller 22 is rotated in a second direction R2 (wherein the first direction R1 is opposed to the second direction R2) so as to prevent the laminated object 25 from being transported across the region between the first heating roller 21 and the second heating roller 22. If the temperature of the first heating roller 21 or the second heating roller 22 is not smaller than the working temperature, the first heating roller 21 is rotated in the second direction R2 and the second heating roller 22 is rotated in the first direction R1 so as to perform the heating and pressing operation In the above embodiments, the first heating roller 21 and the second heating roller 22 of the laminator 2 are bi-directionally driven by a driving mechanism including a motor and a gear. Moreover, those skilled in the art will readily observe that numerous modifications of adjusting the rotating speeds of the heating rollers 21 and 22 may be made while retaining the teachings of the invention.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for controlling heating rollers of a laminator, said laminator comprising a first heating roller and a second heating roller, said method comprising steps of:

detecting the temperature of said first heating roller;

driving said first heating roller to rotate in a first direction and driving said second heating roller to rotate in a second direction if the temperature of said first heating roller is smaller than a working temperature, wherein said first direction is opposed to said second direction; and driving said first heating roller to rotate in said second direction and driving said second heating roller to rotate in said first direction if the temperature of said first heating roller is not smaller than said working temperature.

* * * * *